United States Patent [19]

Matsumura et al.

[11] Patent Number: 4,774,152
[45] Date of Patent: Sep. 27, 1988

[54] REFORMING CATALYST FOR FUEL CELLS

[75] Inventors: Mitsuie Matsumura; Tatsunori Okada; Yoshihide Gonjo, all of Amagasaki, Japan

[73] Assignee: Mitsubishi Denki Kabushiki Kaisha, Japan

[21] Appl. No.: 34,716

[22] Filed: Apr. 6, 1987

[30] Foreign Application Priority Data

Apr. 7, 1986 [JP] Japan .................................. 61-81458

[51] Int. Cl.⁴ .............................................. H01M 8/18
[52] U.S. Cl. ...................................... 429/12; 429/40; 429/44
[58] Field of Search .................. 429/40, 41, 44, 45, 429/16, 19, 17, 12

[56] References Cited

U.S. PATENT DOCUMENTS

| | | | |
|---|---|---|---|
| 4,182,795 | 1/1980 | Baker et al. | 429/13 |
| 4,365,007 | 12/1982 | Maru et al. | 429/19 |
| 4,618,543 | 10/1986 | Matsumura et al. | 429/19 |
| 4,647,516 | 3/1987 | Matsumura et al. | 429/19 |

FOREIGN PATENT DOCUMENTS 58-10374 1/1983 Japan .

Primary Examiner—Anthony Skapars
Attorney, Agent, or Firm—Leydig, Voit & Mayer

[57] ABSTRACT

A reforming catalyst adapted for use with fuel cells is disclosed which is free from degradation in catalytic activity even if subjected to a fuel gas containing an electrolyte or substances resulting therefrom, and which has stable and high catalytic activity for an extended period of time. The reforming catalyst includes a catalytically active substance adapted to reform a fuel gas containing hydrocarbons or alcohols into a fuel gas containing hydrogen and carbon monoxide, and an electrolyte-removing substance adapted to remove an electrolyte and/or substances resulting therefrom in the fuel cell. The electrolyte-removing substance has a porous structure and comprises a compound containing at least one of silicon, aluminum and chromium which chemically reacts with the electrolyte and/or the substances resulting therefrom for removal thereof.

25 Claims, 2 Drawing Sheets

REFORMING CATALYST FOR FUEL CELLS

BACKGROUND OF THE INVENTION

1. Field of the Invention

The present invention relates to a reforming catalyst for fuel cells adapted for use in decomposition of hydrocarbons or alcohols in a molten carbonate type fuel cell power generating system, and more particularly, to a reforming catalyst having an extended activity life.

2. Description of the Prior Art

FIG. 2 schematically shows an example of a power generating system of an externally reforming type having a reformer provided outside a molten carbonate fuel cell, as disclosed in United States GRI report FCR-3522-2. In FIG. 2, the fuel cell power generating system illustrated comprises: a reformer 1 having a tubular reforming reaction portion 1a and a heater portion 1b and adapted to reform a fuel gas including hydrocarbons or alcohols into one including hydrogen and carbon monoxide; a temperature controlling device 2 for controlling the temperature of the fuel gas reformed by the reformer 1; a molten carbonate fuel cell 3 adapted to be supplied with the reformed fuel gas from the reformer 1, to generate electric power; a temperature and humidity controlling device 4 adapted to remove excess moisture from the fuel gas discharged from the fuel cell 3; an air supplying device 5 for supplying air to the heater portion 1b of the reformer 1; and a heat exchanger 6 adapted to take up heat from a part of the oxidant gas which is discharged from the outlet side of the fuel cell 3 and recirculates through the heat exchanger 6 into the inlet side of the fuel cell 3.

In operation, as seen from FIG. 2, a fuel gas including hydrocarbons or alcohols together with a part of the reacted fuel gas discharged from the molten carbonate fuel cell 3 is supplied to the tubular reforming reaction portion 1a of the reformer 1, wherein the hydrocarbons or alcohols in the fuel gas thus supplied are reformed under the action of an appropriate reforming catalyst contained in the reforming reaction portion 1a to produce hydrogen and carbon monoxide, as shown in the following formulae.

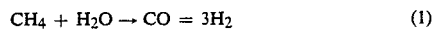

$$CH_4 + H_2O \rightarrow CO = 3H_2 \quad (1)$$

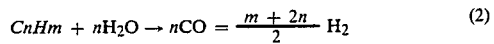

$$C_nH_m + nH_2O \rightarrow nCO = \frac{m + 2n}{2} H_2 \quad (2)$$

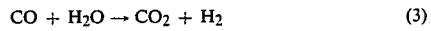

$$CO + H_2O \rightarrow CO_2 + H_2 \quad (3)$$

The reaction heat necessary for the above reforming reactions is obtained by combustion of the remaining part of the fuel gas discharged from the molten carbonate fuel cell 3 in the heater portion 1b.

The fuel gas containing hydrogen and carbon monoxide thus produced is introduced from the reformer 1 into the temperature controlling device 2 wherein the temperature of the fuel gas is appropriately controlled. Thereafter, the temperature-controlled fuel gas is fed to the fuel-gas electrode side of the molten carbonate fuel cell 3.

The molten carbonate fuel cell 3 normally operates at a temperature of 650° C., and the following reactions take place at the fuel gas electrode and the oxidant gas electrode of the fuel cell 3, respectively:

at the fuel gas electrode;

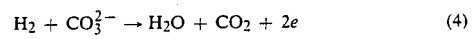

$$H_2 + CO_3^{2-} \rightarrow H_2O + CO_2 + 2e \quad (4)$$

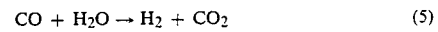

$$CO + H_2O \rightarrow H_2 + CO_2 \quad (5)$$

at the oxidant gas electrode;

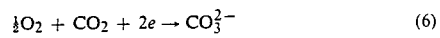

$$\tfrac{1}{2}O_2 + CO_2 + 2e \rightarrow CO_3^{2-} \quad (6)$$

Through the above chemical and electrochemical reactions, the chemical energy of the fuel gas is converted into electrical energy and by-producing thermal energy.

The fuel gas discharged from the molten carbonate fuel cell 3 contains a lot of water vapour as a result of the above reaction (4), and a portion of the fuel gas is returned to the tubular reforming reaction portion 1a of the reformer 1 so as to supply a required amount of water vapour for the above-described reforming reactions (1), (2) and (3).

The remaining portion of the fuel gas discharged from the fuel cell 3, having excess water vapour removed and then appropriately heated by the temperature and humidity controlling device 4, is fed, together with the air from the air supplying device 5, to the heater portion 1b of the reformer 1 wherein the fuel gas reacts with oxygen in the air to combust thus producing combustion heat, almost all of which is given to the reforming reaction portion 1a of the reformer 1 as reaction heat necessary for the reforming reactions (1), (2) and (3).

The fuel gas almost completely oxidized in the heater portion 1b of the reformer 1 is fed, together with the air from the air supplying device 5, to the oxidant gas electrode of the molten carbonate fuel cell 3.

A portion of the oxidant gas discharged from the outlet side of the fuel cell 3 is returned to the inlet side of the fuel cell 3 by way of the heat exchanger 6 so that surplus heat is removed from the oxidant gas and taken out to the outside by means of the heat exchanger 6, and the fuel gas thus removed of surplus heat serves to cool the molten carbonate fuel cell 3.

In this connection, it is to be noted that the conventional reforming catalyst filled in the tubular reforming reaction portion 1a of the reformer 1 is, for example, composed of a substance having catalytic activity such as, for example, nickel carried on a carrier such as a porous inorganic substance having a fine porous structure such as $Al_2O_3$, $LiAlO_2$, $CeO_2$, $MgO$ and the like. The activity of such a reforming catalyst usually more or less changes or reduces with lapse of time, but if such a change is great, problems will arise affecting the steady-state operation of the power generating system. The general causes for such activity reduction are listed below:

(A) The carrier changes chemically or structurally to alter the fine porous structure thereof:

(B) The catalyst is poisoned:

(C) The fine pores in the catalyst are clogged, and the activity points of the catalyst are covered by other substances.

In the power generating system as illustrated in FIG. 2, the water vapour contained in the fuel gas discharged from the molten carbonate fuel cell 3 is effectively utilized as the water vapour necessary for the above reforming reactions (1), (2) and (3), which is a characteristic feature of the system arrangement of FIG. 2. However, the fuel gas supplied to the tubular reforming reaction portion 1a contains electrolytes such as, for example, $K_2CO_3$ and $Li_2CO_3$ evaporated from the electrolyte layer of the molten carbonate fuel cell 3, and the substances such as, for example, KOH and LiOH produced from the electrolytes. These electrolytes and substances produced therefrom serve to promote the reduction in activity of the reforming catalyst. More specifically, the electrolytes or the substances produced therefrom and the carrier chemically react with each other to alter (1) the composition and the fine porous structure of the carrier and (2) produce condensation in the fine pores of the reforming catalyst, and/or (3) cover the active points of the catalyst, thereby promoting activity reduction of the catalyst.

Accordingly, in the system arrangement as illustrated in FIG. 2, the activity reduction of the reforming catalyst is great, and hence such a power generating system is advantageous in terms of effective utilization of the water vapour generated in the fuel cell, but disadvantageous from the viewpoint of the steady-state operation of the power generating system.

On the other hand, FIG. 3 is a perspective view in vertical cross section, showing a molten carbonate fuel cell power generating system of an internally reforming type having a reformer provided inside a molten carbonate fuel cell. In FIG. 3, the fuel cell power generating system illustrated comprises a fuel cell unit including an electrolyte layer 7; a fuel-gas-side electrode 8; a collector panel 10 for supporting the fuel-gas-side electrode 8 or the oxidant-gas-side electrode 9; separator panels impervious to air and adapted to electrically connect a plurality of fuel cell units in a series relation with each other and form gas chambers; gas-passage forming corrugated panels 12 located in the respective gas chambers to form reaction gas passages therein and adapted to assist the electrical connection between the fuel cell units; and a reforming catalyst 13 located in the fuel-gas-side of the respective gas chambers. In FIG. 3, arrow A designates the flow direction of the fuel gas, and arrow B the flow direction of the oxidant gas.

In FIG. 3, the reforming catalyst 13, similar to that employed in the prior art fuel cell power generating system as illustrated in FIG. 2, is inserted in the fuel gas passages defined by the respective gas-flow-passage forming corrugated panels 12. In a molten carbonate fuel cell of the internally reforming type, the reforming catalyst 13 is disposed at a location nearer the electrolyte layer 7 containing an electrolyte and the fuel gas electrode 8 than it is in an externally reforming type fuel cell, so that the reduction in activity of the reforming catalysts 13 due to adverse influences from the electrolyte is far greater than in the case of a power generating system of the externally reforming type shown in FIG. 2. The effective life of an existing molten carbonate fuel cell of the internally reforming type greatly depends on the activity of the reforming catalysts 13. Presently, the effective life of these fuel cells ranges from about several thousand to about ten thousand hours.

In this connection, it is to be noted that a general process for producing a conventional reforming catalyst is described in British Pat. No. 1,182,829.

As apparent from the foregoing, in order to enable the molten carbonate fuel cell power generating system to operate in a stable manner for an extended period of time, it is necessary to develop a novel reforming catalyst, the activity level of which is not lowered due to the vapour of the electrolyte.

The above-described conventional reforming catalyst, however, has the problem that the catalytic activity of the reforming catalyst will be lowered due to contact thereof with an electrolyte generated by the fuel cell or substances produced by the electrolyte, so that the fuel cell power generating system employing such a conventional reforming catalyst can not operate in a stable manner for a long period of time because of degradation in activity of the reforming catalyst.

SUMMARY OF THE INVENTION

In view of the above, the present invention is intended to obviate the above-described problems of the prior art, and has for its object the provision of a novel and improved reforming catalyst adapted for use with fuel cells which is free from degradation in catalytic activity even if subjected to a fuel gas containing an electrolyte and/or substances resulting therefrom, and which has stable and high catalytic activity for an extended period of time.

In order to achieve the above object, the present invention provides a reforming catalyst for a fuel cell employing an electrolyte comprising a catalytically active substance adapted to reform a fuel gas containing hydrocarbons or alcohols into a fuel gas containing hydrogen and carbon monoxide, and an electrolyte-removing substance adapted to remove the electrolyte and/or substances resulting therefrom in the fuel cell.

It is preferable that the electrolyte-removing substance have a porous structure and comprise a compound containing at least one of silicon, aluminum and chromium which chemically reacts with the electrolyte and/or the substances resulting therefrom for removal thereof.

The electrolyte-removing substance is provided on the surface of or dispersed in the catalytically active substance.

A catalytically active portion is composed of a catalyst carrier and a catalytically active substance in a manner such that a catalyst carrier of a porous inorganic substance may be provided by which the catalytically active substance is carried. In this case, the porosity of the electrolyte-removing substance is preferably equal to or greater than that of the catalyst carrier.

The electrolyte-removing substance of the reforming catalyst of the present invention serves to preferentially eliminate the electrolyte and/or the resultant substances from the fuel gas. Accordingly, the catalytically active substance of the reforming catalyst is supplied with clean fuel gas so that degradation in activity of the reforming catalyst due to the electrolyte and/or the resultant substances can be effectively eliminated.

The above and other objects, features and advantages of the present invention will become apparent from the following detailed description of a presently preferred embodiment of the invention when taken in conjunction with the accompanying drawings.

DESCRIPTION OF THE PREFERRED EMBODIMENT

Figure 1:
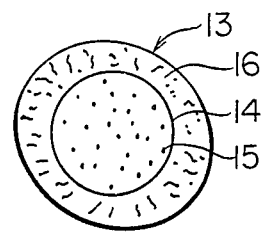
FIG. 1 is a cross sectional view of a reforming catalyst produced according to the present invention.
Figure 2:
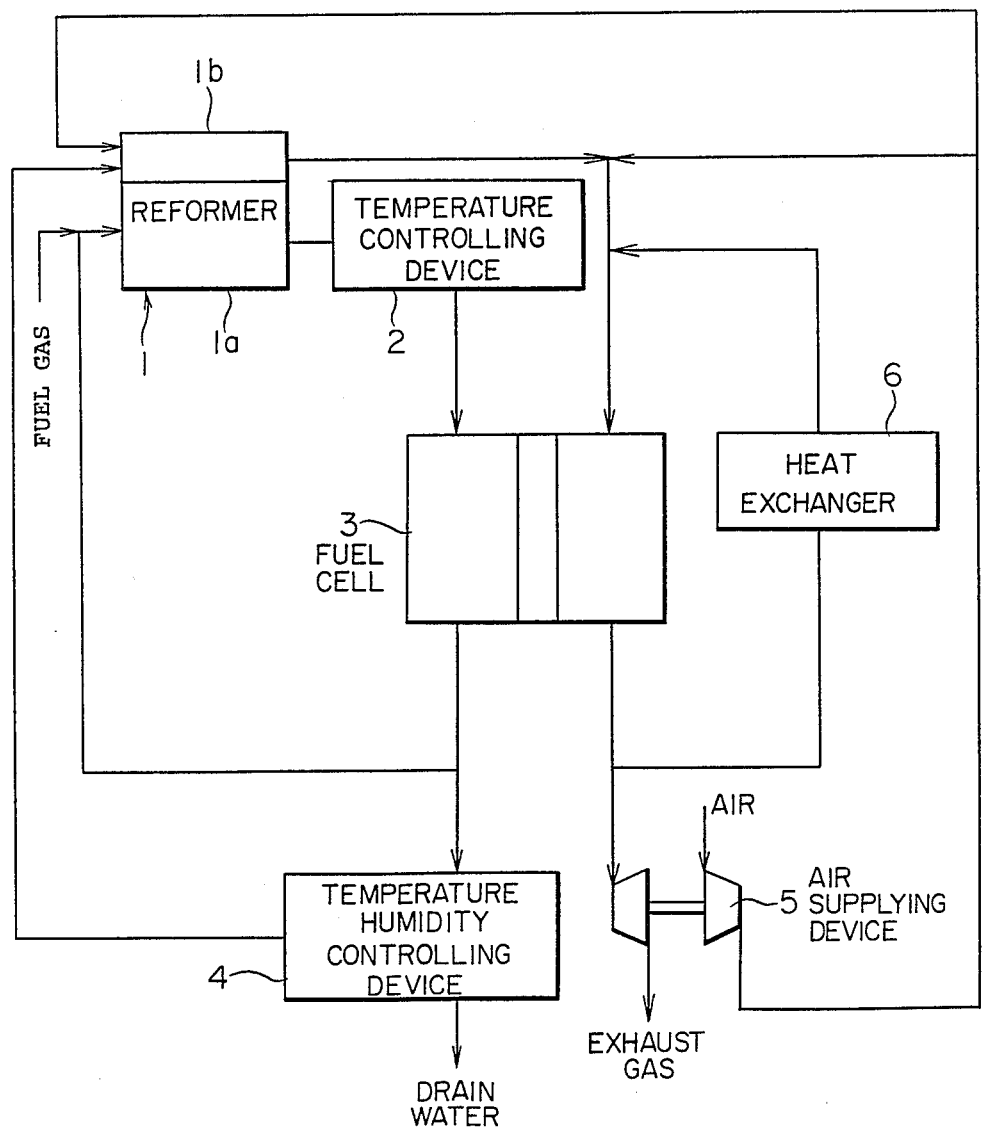
FIG. 2 is a schematic illustration showing the general arrangement of a power generating system of the externally reforming type employing a general type of molten carbonate fuel cell.

Referring to FIG. 1, there is cross-sectionally shown a reforming catalyst of granular form, generally designated by reference numeral 13, in accordance with the present invention. In this Figure, the reforming catalyst of the present invention illustrated comprises a catalyst carrier 14 formed of a porous inorganic substance having a fine pore structure such as, for example, $LiAlO_2$, $CeO_2$, MgO or the like, a catalytically active substance 15 such as, for example, nickel or the like, and an electrolyte-removing substance 16 of a porous structure such as, for example, silica (silicon dioxide) or the like.

As illustrated in FIG. 1, the reforming catalyst 13 of the illustrated embodiment includes a first portion (a catalytically active portion) composed of the catalyst carrier 14 and the catalytically active substance 15 carried by the catalyst carrier 14, and a second portion provided on the surface of the first portion and composed of the electrolyte-removing substance 16 having the function of removing an electrolyte contained in a fuel gas and/or substances produced from the electrolyte. Hydrocarbons or alcohols and water vapour contained in the fuel gas diffuse, together with the electrolyte or the substances resulting therefrom, from the surface toward the interior of the reforming catalyst 13 through fine pores in the electrolyte-removing substance 16. Here, it is to be noted that the porosity of the electrolyte-removing substance 16 is set to be 40 % for example, and the electrolyte and/or the resultant substances are subject to chemical reactions and/or adsorbing reactions with substances highly reactive therewith so as to remove the electrolyte and/or the resultant substances from the fuel gas. More specifically, silica (silicon dioxide), for example, chemically reacts with the electrolyte to produce silicate, thereby removing the electrolyte.

Thereafter, the purified fuel gas with the electrolyte and/or the resultant substances thus removed further diffuse through the fine pores in the electrolyte-removing substance 16 towards the catalyst carrier 14 and the catalytically active substance 15 wherein it is subject to the reforming reactions (1), (2) and (3) as previously referred to. Accordingly, in the reforming catalyst of this embodiment, the catalyst carrier 14 and the catalytically active substance 15 both being catalytically active are protected from the electrolyte contained in the fuel gas and/or the resultant substances produced therefrom by means of the electrolyte-removing substance 16 so that reduction or degradation in activity of the reforming catalyst due to the electrolyte can be substantially suppressed.

In this regard, it is desirable that the proportion of the electrolyte-removing substance 16 in the reforming catalyst 13 be kept as small as possible in view of the activity of the entire reforming catalyst 13, and also take the form of a porous structure.

For example, in the case of a conventional reforming catalyst including a catalyst carrier 14 of MgO and a catalytically active substance of Ni, the reduction or degradation in catalytic activity thereof will generally become remarkable when the proportion of an electrolyte or the resultant substances produced therefrom which are attached to the reforming catalyst during the operation of the fuel cell exceeds 2–3 wt. % or so. If it is assumed that the total operation time of the power generating system be about 40,000 hours, in the case of the electrolyte-removing substance 16 formed of silica, about 20 weight percent silica is required in order to suppress the amount of the electrolyte attached to the catalytically active substance 15 to about 2–3 wt. % or less. The reforming catalyst 13 of the present invention as illustrated in FIG. 1 is, for example, obtained by forming a layer of an electrolyte-removing substance 16 such as silica on the surface of a conventional reforming catalyst. Some examples of method for forming such an electrolyte-removing layer are set out below. In one method, silica containing a small amount of moisture or a binder material is coated on the surface of a conventional reforming catalyst, and then dried and calcinated. In another method, a suspension liquid composed of silica, a binder and a solvent is attached by spray coating or impregnation to the surface of a conventional reforming catalyst, and then dried and calcinated to provide a novel reforming catalyst of the present invention.

Figure 3:
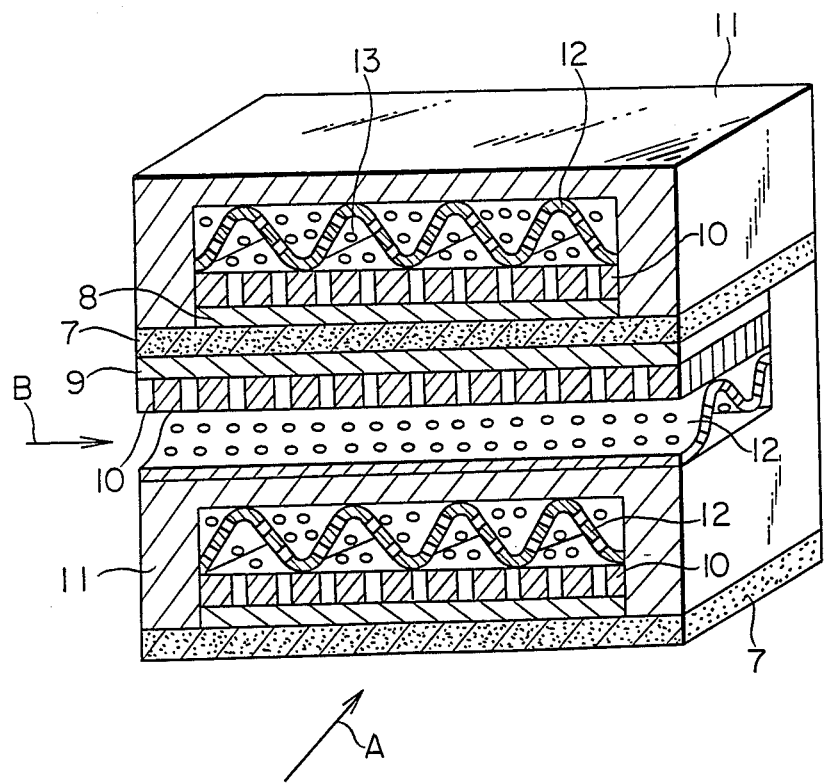
FIG. 3 is a perspective view in cross section, showing the construction of a molten carbonate fuel cell of the internally reforming type.

As illustrated in FIG. 3, in the molten carbonate fuel cell of the internally reforming type, the reforming catalyst 13 is exposed to an atmosphere containing an electrolyte or resultant substances produced therefrom under more severe conditions. Accordingly, if the present invention is applied to such a molten carbonate fuel cell of the internally reforming type, greater effects or advantages will be obtainable. This can be achieved by employing the reforming catalyst shown in FIG. 1 in place of that shown in FIG. 3.

In the above embodiment, it is desirable that the carrier 14 be selected from substances such as, for example, $LiALO_2$, $CeO_2$, MgO or the like having poor reactivity with the electrolyte and/or the substances resulting therefrom from the viewpoint of designing of much safer catalysts.

Although in the above embodiment, the catalytically active substance 15 is carried by the catalyst carrier 14 alone, it may also be carried by the electrolyte-removing substance 16.

Also, in the above embodiment, the electrolyte-removing substance 16 is provided on the surface of the reforming catalyst 13 which directly contacts the fuel gas, but it may be formed in the reforming catalyst 13 in a dispersed manner. In this case, in order to simplify the production process, it is possible, from the viewpoint of protecting the catalyst carrier 14 and the catalytically active substance 15 from the electrolyte, to mould the carrier 14 and the electrolyte-removing substance 16 in a mixed form, though this is somewhat inferior to the above-described embodiment.

Further, where the catalyst activity substance 15 is even if the carrier 14 is omitted, the reforming catalyst 13 can be formed of the catalytically active substance 15 and the electrolyte-removing substance 16 alone.

Moreover, the electrolyte-removing substance 16 is not limited to silica (silicon dioxide), but it may be formed of one of silicon compounds (such as silicon oxide, silicon carbonate or silicon hydroxide), aluminum compounds (such as aluminum oxide, aluminum carbonate or aluminum hydroxide) and chromium compounds (chromium oxide, chromium carbonate or chromium hydroxide).

Furthermore, although in the above embodiment, the electrolyte-removing substance 16 is of a porous structure having a porosity of 40% or so, it is not limited to this. In this regard, however, it is desirable that the porosity of the electrolyte-removing substance 16 be equal to or greater than that of the catalytically active substance 15 or of the catalyst carrier 14 from the viewpoint of diffusion of the fuel gas into the reforming catalyst 13.

We claim:

1. A fuel cell employing an electrolyte comprising a catalytically active substance adapted to reform a fuel gas containing hydrocarbons or alcohols into a fuel gas containing hydrogen and carbon monoxide, and an electrolyte-removing substance adapted to remove said electrolyte and/or substances resulting thereform in said fuel cell.

2. A fuel cell as set forth in claim 1 wherein said electrolyte-removing substance has porous structure.

3. A fuel cell as set forth in claim 1 wherein said electrolyte-removing substance is provided on the surface of said catalytically active substance.

4. A fuel cell as set forth in claim 2 wherein said electrolyte-removing substance is provided on the surface of said catalytically active substance.

5. A fuel cell as set forth in claim 1 wherein said electrolyte-removing substance chemically reacts with said electrolyte and/or said substances resulting therefrom for removal thereof.

6. A fuel cell as set forth in claim 2 wherein said electrolyte-removing substance chemically reacts with said electrolyte and/or said substances resulting therefrom for removal thereof.

7. A fuel cell as set forth in claim 3 wherein said electrolyte-removing substance chemically reacts with said electrolyte and/or said substances resulting therefrom for removal thereof.

8. A fuel cell as set forth in claim 4 wherein said electrolyte-removing substance chemically reacts with said electrolyte and/or said substances resulting therefrom for removal thereof.

9. A fuel cell as set forth in claim 5 wherein said electrolyte-removing substance comprises a compound containing at least one of silicon, aluminum and chromium.

10. A fuel cell as set forth in claim 6 wherein said electrolyte-removing substance comprises a compound containing at least one of silicon, aluminum and chromium.

11. A fuel cell as set forth in claim 7 wherein said electrolyte-removing substance comprises a compound containing at least one of silicon, aluminum and chromium.

12. A fuel cell as set forth in claim 8 wherein said electrolyte-removing substance comprises a compound containing at least one of silicon, aluminum and chromium.

13. A fuel cell as set forth in claim 1 wherein said catalytically active substance is carried by said electrolyte-removing substance.

14. A fuel cell as set forth in claim 13 wherein said electrolyte-removing substance is dispersed in said catalytically active substance.

15. A fuel cell as set forth in claim 14 wherein said catalytically active substance and said electrolyte-removing substance are moulded in a mixed state.

16. A fuel cell as set forth in claim 1 wherein said catalyst activity substance is nickel.

17. A fuel cell as set forth in claim 1 further comprising a catalyst carrier by which said catalytically active substance is carried.

18. A fuel cell as set forth in claim 17 wherein said catalyst carrier comprises a porous inorganic substance.

19. A fuel cell as set forth in claim 18 wherein the porosity of said electrolyte-removing substance is equal to or greater than that of said catalyst carrier.

20. A fuel cell as set forth in claim 18 wherein said porous inorganic substance is $LiAlO_2$, $CeO_2$ or $MgO$.

21. A fuel cell as set forth in claim 17 wherein said catalytically active substance is also carried by said electrolyte-removing substance in addition to said catalyst carrier.

22. A fuel cell as set forth in claim 21 wherein said electrolyte-removing substance is provided on the surface of said catalytically active substance.

23. A fuel cell as set forth in claim 21 wherein said electrolyte-removing substance is dispersed in said catalytically active substance.

24. A fuel cell as set forth in claim 23 wherein said catalytically active substance and said electrolyte-removing substance is moulded in a mixed state.

25. A fuel cell as set forth in claim 17 wherein said electrolyte-removing substance is provided on the surface of said catalytically active surface

* * * * *